United States Patent
Edwards

(10) Patent No.: US 6,302,405 B1
(45) Date of Patent: Oct. 16, 2001

(54) ANTI-EXTRUSION SEAL

(75) Inventor: Charles N. Edwards, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/338,961

(22) Filed: Jun. 24, 1999

(51) Int. Cl.[7] ........................................ F16J 15/16
(52) U.S. Cl. ................... 277/584; 277/336; 277/342; 277/937; 277/938; 277/944
(58) Field of Search .................. 277/437, 584, 277/905, 937, 938, 944, 946, 341, 342, 336

(56) References Cited

U.S. PATENT DOCUMENTS

| | | |
|---|---|---|
| Re. 30,690 | 7/1981 | Canalizo . |
| 541,894 * | 7/1895 | Symons et al. ............... 277/547 |
| 2,235,809 * | 3/1941 | Gilmer ........................... 277/469 |
| 2,765,204 * | 10/1956 | Josephson ..................... 277/492 |
| 2,823,058 * | 2/1958 | Ecker et al. ................... 277/589 |
| 4,188,998 | 2/1980 | Upton . |
| 4,214,629 * | 7/1980 | Upton ............................ 166/129 |
| 4,234,197 | 11/1980 | Amancharla . |
| 4,263,361 * | 4/1981 | Hodes et al. .................. 428/240 |
| 4,406,469 | 9/1983 | Allison . |
| 4,411,439 | 10/1983 | Couvillion et al. . |
| 4,433,847 | 2/1984 | Weinberg . |
| 4,436,316 * | 3/1984 | Karr, Jr. . |
| 4,456,215 * | 6/1984 | Bishop et al. ................. 251/1 B |
| 4,477,093 | 10/1984 | Adamek . |
| 4,493,373 | 1/1985 | Jackson . |
| 4,576,385 | 3/1986 | Ungchusri et al. . |
| 4,674,756 | 6/1987 | Fallon et al. . |
| 4,720,113 | 1/1988 | Hertz, Jr. . |
| 4,730,835 | 3/1988 | Wilcox et al. . |
| 4,811,959 | 3/1989 | Bullard et al. . |
| 4,840,379 * | 6/1989 | Thoman, Jr. .................. 277/584 |
| 4,986,511 * | 1/1991 | Irby et al. ...................... 251/1.3 |
| 5,088,744 | 2/1992 | Oseman . |
| 5,129,739 * | 7/1992 | Asai et al. ..................... 384/292 |
| 5,131,666 | 7/1992 | Hutchens . |
| 5,158,030 * | 10/1992 | DuBois et al. ................ 114/201 |
| 5,524,905 * | 6/1996 | Thoman et al. ............... 277/572 |
| 5,879,010 * | 3/1999 | Nikanth et al. ............... 277/545 |
| 5,988,649 * | 11/1999 | Van Ryper et al. ........... 277/435 |

OTHER PUBLICATIONS

Greene, Tweed GT Rings, 10,000 and 12,000 series.
Greene, Tweed AGT Ring, High–Performance Double–Acting Aerospace Seals.

\* cited by examiner

*Primary Examiner*—Anthony Knight
*Assistant Examiner*—Alison K. Pickard
(74) *Attorney, Agent, or Firm*—Trop, Pruner & Hu PC

(57) ABSTRACT

A seal assembly formed of a T-seal, a pair of back-up rings abutting each side of the T-seal, and a bearing abutting the side of each of the back-up rings. The T-seal is formed of a elastomer material, the back-up ring is formed of a PTFE (polytetraflouroethylene polymer) material, and the bearings are formed of a carbon reinforced PEEK (polyetheretherketone) material.

14 Claims, 2 Drawing Sheets

ANTI-EXTRUSION SEAL

BACKGROUND OF THE INVENTION

1. Field of Invention

The present invention relates to the field of seals. More specifically, the invention relates to a device and method for providing a high temperature, high pressure seal that is resistant to extrusion.

2. Related Art

In many applications, for example in oil wells, seals are subjected to high temperature and high pressure. Numerous seal designs have been developed to provide adequate sealing in such environments. One type of seal commonly used are T-seals that have a generally rectangular base and a central protrusion extending perpendicularly from the base. T-seals are effective at avoiding problems commonly encountered with o-ring seals, such as the tendency of o-ring seals to twist when used for reciprocating service. Such a twist of an o-ring seal can cause tearing and failure of the seal.

The T-seal is placed between a first and second component between which a seal is desired. The bottom of the base of the T-seal abuts the first component and the top of the protrusion of the T-seal abuts the second component to provide the desired seal. However, one problem associated with T-seals used in very high temperature, high pressure, reciprocating service, particularly for small diameter sealing (such as less than ⅝") is extrusion. Under these conditions, the elastomer T-seals tend to extrude and fail. As an example, it is desirable to provide seals for use in oil wells, that can operate at temperatures of 400 ° F. and 15,000 psig. However, current commercial T-seals are incapable of this type of service. Thus, despite the use of the prior art features, there remains a need for a seal for use in very high temperature, high pressure service.

SUMMARY

To achieve such improvements, the present invention provides a seal assembly formed of a T-seal, a pair of back-up rings abutting each side of the T-seal, and a bearing abutting the side of each of the back-up rings. In one preferred embodiment, the T-seal is formed of a elastomer material, the back-up ring is formed of a PTFE (polytetraflouroethylene polymer) material, and the bearings are formed of a carbon reinforced PEEK (polyetheretherketone) material.

BRIEF DESCRIPTION OF THE DRAWINGS

The manner in which these objectives and other desirable characteristics can be obtained is explained in the following description and attached drawings in which.

Figure 1:
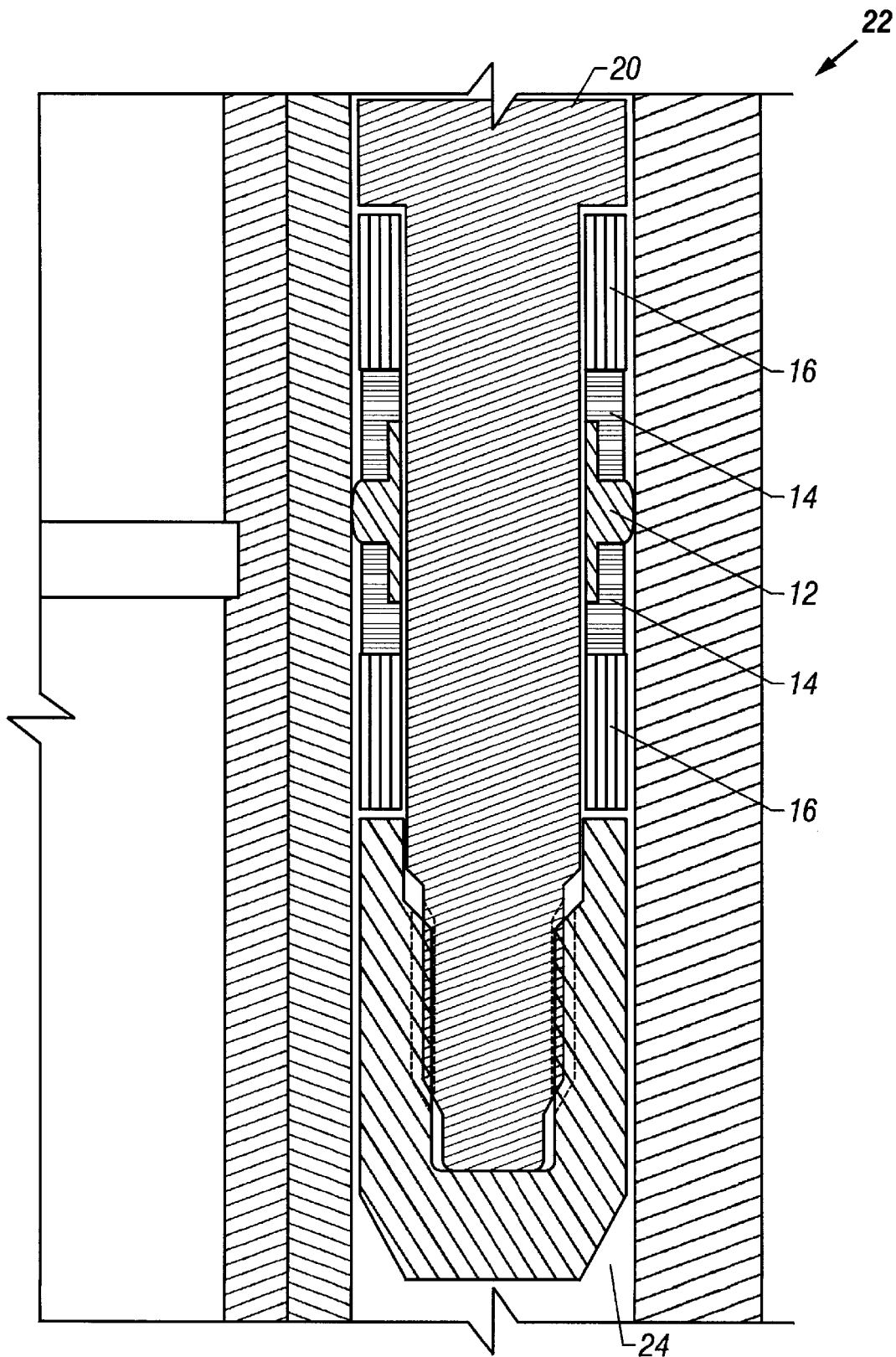
FIG. 1 is a cross sectional, side elevational view of a portion of a rod piston actuated subsurface safety valve incorporating the present invention.

It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

The present invention generally provides a seal assembly 10 formed of a T-seal 12, a pair of back-up rings 14 abutting each side of the T-seal 12, and a bearing 16 abutting the side of each of the back-up rings 14. In one preferred embodiment, the T-seal 12 is formed of a flouroelastomer material; the back-up ring 14 is formed of relatively soft material such as PTFE (polytetraflouroethylene polymer) reinforced with molybdenumdisulfide and glass; and the bearings 16 are formed of a carbon reinforced PEEK (polyetheretherketone) material.

The present invention is applicable to any application requiring seals wherein two components need to be sealed. For example, the seal may be used in the place of other seals, such as T-seal 12s and o-rings. However, one area in which the seal provides exceptional service, not attainable by presently commercially available seals, is in applications of high temperature (above 300 ° F.) and high pressure (above 10,000 psig), especially when the components to be sealed are reciprocating relative to one another. To facilitate the description of the seals, the seals are described herein as applied to a rod piston 20 of a subsurface safety valve 22. The description of the seals in conjunction with this specific tool is for ease of description and understanding only for the seal has application to many other tools and component sealing. Thus, in the following discussion, the seal is described as sealing around a first component, the piston 20, and a second component, the bore 24 housing the piston 20.

FIG. 1 shows a rod piston 20 assembly 10 of a typical rod piston 20, hydraulically controlled, subsurface safety valve 22 incorporating the seal of the present invention. Pressure supplied to the piston 20 from the surface moves the piston 20 to actuate the valve 22 open and closed. The seals isolate the pressure within the valve 22 from the control pressure acting on the piston 20 by sealing between the piston 20 and the bore 24. The actuating pressure and the environment of the well in which the safety valve 22 is positioned can create a high temperature, high pressure condition for the seals.

Figure 2:
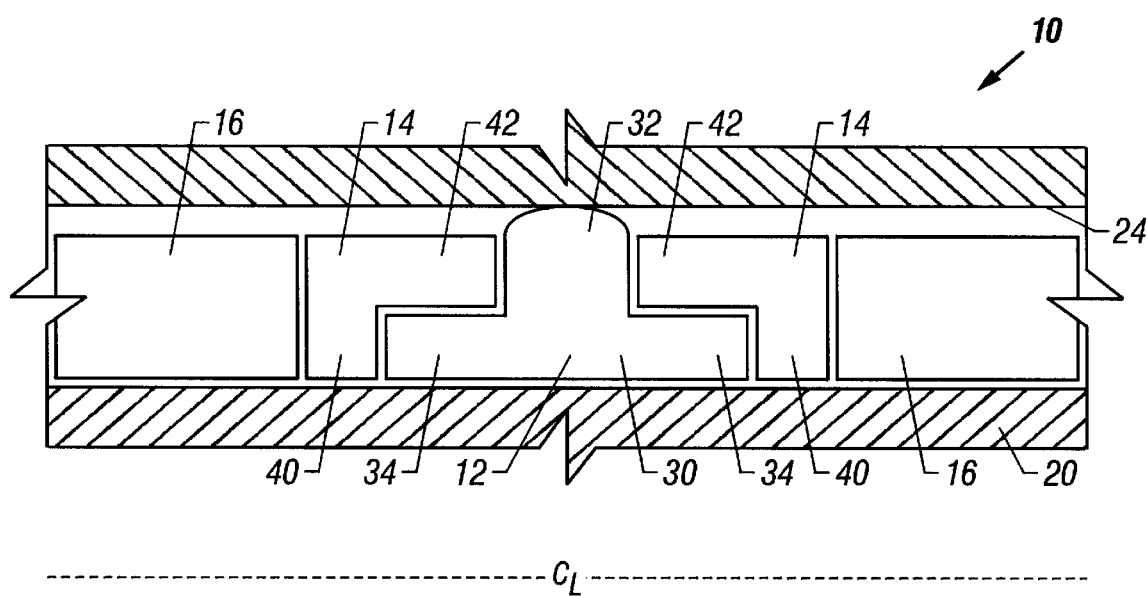
FIG. 2 is a cross sectional view of the seal assembly of the present invention positioned on a piston.

FIG. 2 is a cross sectional view of the seal assembly 10. In general, the seal assembly 10 is formed of a T-seal 12, back-up rings 14, and bearings 16. The T-seal 12 is a standard elastomer seal that, in one preferred embodiment is formed of a flouroelastomer compound based upon a copolymer of tetrafluoroethylene and propylene, although other elastomers and materials may also be suitable depending upon the application.

The T-seal 12 has a generally rectangular base 30 and a central protrusion 32 extending perpendicularly from the general center of the base 30. The portions of the base 30 extending to either side of the protrusion 32 are referred to as flanges 34. The bottom of the T-seal 12 abuts the piston 20 and the top of the T-seal 12 abuts the bore 24 to complete the seal.

Abutting each side of the T-seal 12 are back-up rings 14. The back-up rings 14 preferably extend the full height of the T-seal 12 and abut substantially the full side of the T-seal 12 to lend lateral support to the T-seal 12. In one preferred embodiment, shown in FIG. 2, the back-up rings 14 cross sectional shape is that of an inverted-L. The inverted-L shape has a first portion 40 extending radially from the piston 20 to the bore 24 and abutting the side of the flange 34 of the T-seal 12 and a second portion 42 extending axially from the first portion 40 toward the protrusion 32 and substantially filling the area between the flange 34, the protrusion 32, and the first portion 40. Therefore, the inner diameter of the back-up ring 14 rests on flange 34 of the T-seal 12 and on the piston 20. Thus, the inverted-L shape is capable of supporting substantially the full side of the T-seal 12.

Note that possible alternative embodiments including voids in the back-up ring 14 that provide non-abutting portions between the top and bottom of the T-seal 12 and back-up ring 14 are considered within the scope of the present invention and the term "substantially the fill side of the T-seal 12" specifically includes such alternatives. Further, the components of the back-up rings 14 and the T-seal 12 may undergo expansion due to thermal variations. Therefore, the back-up ring 14 may include gaps or may have a height that is less than the full height of the T-seal 12 at certain temperatures and may not technically support the complete side of the T-seal 12 at all temperatures. These design characteristics may be required to achieve the desired performance at a target service temperature range or for other reasons. However, such designs and variations are considered part of the present invention and within the scope of the present invention and the term "substantially the full side of the T-seal 12" specifically includes such alternatives.

Previous back-up rings 14 for high pressure applications are typically formed of a relatively hard material and are normally scarf cut, to facilitate their installation, so they do not form a complete ring. These cuts tend to open under high pressure. At high heat, the elastomer of the T-seal 12 softens and tends to extrude into the cuts or around the edges. The sharp edges formed by the cuts in the hard plastic back-up rings 14 cut the extruded elastomer T-seals 12.

To avoid the problems associated with the prior back-up rings 14, the present invention uses back-up rings 14 formed of a relatively softer back-up material than previous back-up rings 14. Also, the back-up rings 14 of the present invention are not scarf cut, but form complete rings. One such preferred material for the present invention is PTFE (polytetraflouroethylene polymer) reinforced with molybdenumdisulfide and glass, although other relatively soft materials may be acceptable depending upon the specific application.

By using the softer material, the back-up rings 14 deform under pressure to compress between the flange 34 and bore 24 and thereby prevent extrusion of the T-seal 12. Thus, the back-up ring 14 blocks the extrusion gaps at the top and bottom of the bearings 16 of the seal assembly 10 and supports the T-seal 12.

Abutting the side of each of the back-up rings 14 opposite the T-seal 12 are bearings 16. Because of the softer material used for the back-up rings 14, the back-up rings are prone to creep and, therefore, must be supported laterally. The bearings 16 prevent creep by providing lateral support to the relatively soft back-up rings 14. Accordingly, the bearing 16 must be formed of a material that has a relatively high resistance to creep, or deformation under load. Note that as described above in connection with the abutment of the back-up rings to the T-seal, the abutment of the bearings to the back-up rings may include voids or other variation without departing from the scope of the present invention and claims.

Materials having a shear strength between about 16,000 psi and about 20,000 psi are generally suitable to provide the desired resistance to creep. In particular, carbon reinforced PEEK (polyetheretherketone) material is sufficiently resistant to creep, having a shear strength of about 17,900 psi, and represents a preferred material for the bearing 16 of the present invention.

In addition, bearings 16 formed of carbon reinforced PEEK have a relatively low coefficient of friction and a relatively low coefficient of thermal expansion. These material properties allow the bearing 16 to further provide radial support acting as a bearing to the piston 20 and keep the piston 20 off the bore 24. These material properties are important to allow the bearing 16 to deform only slightly under high pressure, particularly after the material is softened slightly under high temperature. The deformation allows the bearing 16 to touch the bore 24 and the piston 20. Thus, the low coefficient of thermal expansion is important to limit the expansion of the bearing 16 and allow it merely to touch the sealed components and act as an effective bearing 16.

Also, the bearings 16 act as a wiper to keep debris from the T-seal 12. As the piston 20 reciprocates in the bore 24, it sweeps the seal assembly 10 against the bore 24. The bearings 16 move ahead of the T-seal 12 touching the bore 24 and wiping debris from the path of the T-seal 12. Thus, the bearings 16 help protect the T-seal 12 from encountering debris as it moves axially, abutting and sealing with the bore 24.

Although carbon reinforced PEEK is a preferred material for the bearings 16, any material that has a relatively low coefficient of friction, such as in the range between about 0.15 and about 0.55, and a relatively low coefficient of thermal expansion such as between about $0.7\times10^{-5}$ 1/° F. and about $0.9\times10^{-5}$ 1/° F. in upon the particular application of the seal assembly 10. Carbon reinforced PEEK falls within these ranges having a coefficient of friction of about 0.35 and a coefficient of thermal expansion of about $0.8\times10^{-5}$ 1/° F.

A seal assembly 10 of the present invention having a diameter of 5/16 inch was successfully tested at 400° F. at 22,000 psig in a static test fixture. The seal assembly 10 of the present invention having a diameter of 5/16 inch was also successfully tested at 400° F. at 15,000 psig in a dynamic test fixture for 300 cycles using a nitrogen gas simulating the well pressure. Therefore, the seal of the present invention satisfies the requirements of a very high pressure, high temperature reciprocating application.

Although the foregoing description frames the back-up ring 14 and the bearing 16 as separate components, it may be possible to fuse the components together so that they appear as a single member.

Describing the seal assembly 10 having back-up ring 14 and bearing 16 as a single member, whether fused together or not, the seal assembly 10 includes a T-seal 12 and a support member. The support member has an inner portion formed of a relatively soft material that abuts opposing sides of the T-seal 12. The support member also has an outer portion separated from the T-seal 12. The outer portion is formed of a material having a relatively high resistance to creep.

While the foregoing is directed to the preferred embodiment of the present invention, other and further embodiments of the invention may be devised without departing from the basic scope thereof, and the scope thereof is determined by the claims which follow. It is the express intention of the applicant not to invoke 35 U.S.C. § 112, paragraph 6 for any limitations of any of the claims herein, except for those in which the claim expressly uses the word "means" together with an associated function.

I claim:

1. A seal assembly, comprising:
   a T-seal having opposing sides;
   a back-up ring abutting each side of the T-seal, the back-up rings having opposing sides, each back-up ring being generally L-shaped to support substantially a full side of the T-seal, each back-up ring formed of a deformable material to deform under pressure to prevent extrusion of the T-seal; and a bearing abutting each of the back-up rings, each bearing abutting the side of the corresponding back-up ring opposite the side abutting the T-seal, each bearing being formed of a material having a shear strength between about 16,000 and 20,000 psi, wherein each back-up ring forms a complete ring without a scarf cut.

2. The assembly of claim 1, wherein each back-up abuts substantially a corresponding full side of the T-seal.

3. The assembly of claim 1, wherein each of the bearings abuts substantially the full side of the abutting back-up ring.

4. The assembly of claim 1, wherein each back-up ring if formed of polytetraflouroethylene polymer reinforced with molybdenumdisulfide and glass.

5. The assembly of claim 1, wherein each back-up ring is formed of polytetraflouroethylene polymer.

6. The assembly of claim 1, wherein each back-up ring is formed of relatively soft material.

7. The assembly of claim 1, wherein each bearing is formed of carbon reinforced polyetheretherketone.

8. The assembly of claim 1, wherein each bearing is formed of a material having a coefficient of friction between about 0.15 and about 0.55.

9. The assembly of claim 1, wherein each bearing is formed of a material having a coefficient of friction of about 0.35.

10. The assembly of claim 1, wherein each bearing is formed of a material having a coefficient of thermal expansion between about $0.7 \times 10^{-5}$ 1/° F. and about $0.9 \times 10^{-5}$ 1/° F.

11. The assembly of claim 1; wherein each bearing is formed of a material having a shear strength of about 17,900 psi.

12. The seal assembly of claim 1, wherein each back-up ring forms a complete ring.

13. A method of sealing, comprising:

providing a T-seal;

supporting substantially the full height of the T-seal on each side with a back-up ring formed of a relatively soft material;

supporting the back-up rings with bearings formed of a material having a coefficient of friction between about 0.15 and about 0.55, a coefficient of thermal expansion between about $0.7 \times 10^{-5}$ 1/° F. and about $0.9 \times 10^{-5}$ 1/° F., and a relatively high resistance to creep, wherein supporting substantially the full height of the T-seal on each side with the back-up ring comprises supporting with a back-up ring that forms a complete ring without a scarf cut.

14. The method of claim 13, wherein supporting substantially the fall height of the T-seal on each side with the back-up ring comprises supporting with a generally L-shaped back-up ring.

* * * * *